US011361531B2

United States Patent
Bousmalis et al.

(10) Patent No.: US 11,361,531 B2
(45) Date of Patent: *Jun. 14, 2022

(54) DOMAIN SEPARATION NEURAL NETWORKS

(71) Applicant: Google LLC, Mountain View, CA (US)

(72) Inventors: Konstantinos Bousmalis, London (GB); Nathan Silberman, Brooklyn, NY (US); Dilip Krishnan, Arlington, MA (US); George Trigeorgis, Nicosia (CY); Dumitru Erhan, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/222,782

(22) Filed: Apr. 5, 2021

(65) Prior Publication Data

US 2021/0224573 A1 Jul. 22, 2021

Related U.S. Application Data

(63) Continuation of application No. 16/321,189, filed as application No. PCT/GR2016/000035 on Jul. 28, 2016, now Pat. No. 10,970,589.

(51) Int. Cl.
*G06K 9/46* (2006.01)
*G06V 10/44* (2022.01)
(Continued)

(52) U.S. Cl.
CPC ......... *G06V 10/449* (2022.01); *G06K 9/6232* (2013.01); *G06K 9/6268* (2013.01); *G06K 9/6298* (2013.01); *G06N 3/0454* (2013.01); *G06N 3/084* (2013.01); *G06T 7/74* (2017.01); *G06V 10/451* (2022.01); *G06T 2207/20081* (2013.01); *G06T 2207/20084* (2013.01)

(58) Field of Classification Search
CPC .................................................. G06K 9/4619
See application file for complete search history.

(56) References Cited

U.S. PATENT DOCUMENTS

2016/0093048 A1  3/2016  Cheng et al.

OTHER PUBLICATIONS

KR Office Action in Korean Application No. 10-2019-7005982, dated Apr. 6, 2021, 6 pages (with English translation).

(Continued)

*Primary Examiner* — Tuan H Nguyen
(74) *Attorney, Agent, or Firm* — Fish & Richardson P.C.

(57) ABSTRACT

Methods, systems, and apparatus, including computer programs encoded on computer storage media, for processing images using an image processing neural network system. One of the system includes a shared encoder neural network implemented by one or more computers, wherein the shared encoder neural network is configured to: receive an input image from a target domain; and process the input image to generate a shared feature representation of features of the input image that are shared between images from the target domain and images from a source domain different from the target domain; and a classifier neural network implemented by the one or more computers, wherein the classifier neural network is configured to: receive the shared feature representation; and process the shared feature representation to generate a network output for the input image that characterizes the input image.

25 Claims, 4 Drawing Sheets

(51) Int. Cl.
G06K 9/62 (2022.01)
G06N 3/04 (2006.01)
G06N 3/08 (2006.01)
G06T 7/73 (2017.01)

(56) References Cited

OTHER PUBLICATIONS

EP Office Action in European Application No. 16757929.1, dated May 26, 2021, 4 pages.
Abadi et al., "Tensorflow: Large-scale machine learning on heterogeneous distributed systems," arXiv: 1603.04467, Mar. 2016, 19 pages.
Ajakan et al., "Domain-adversarial neural networks," arXiv.org: 1412.4446, Feb. 2015, 9 pages.
Arbelaez et al., "Contour detection and hierarchical image segmentation," IEEE TPAMI, Aug. 2010, 33(5):898-916.
Ben-David et al., "A theory of learning from different domains," Machine learning, May 2010, 79(1-2):151-175.
Caseiro et al., "Beyond the shortest path: Unsupervised Domain Adaptation by Sampling Subspaces Along the Spline Flow," CVPR, 2015, 3846-3854.
Chen et al., "Deep semi-supervised learning for domain adaptation" IEEE 25th International Workshop on Machine Learning for Signal Processing, 2015, 7 pages.
Eigen et al., "Depth map prediction from a single image using a multi-scale deep network," NIPS, 2014, 2366-2374.
Gan et al. "Deep self-taught learning for facial beauty prediction," Neurocomputing, vol. 144, Jun. 2014, 17 pages.
Ganin and Lempitsky, "Unsupervised domain adaptation by backpropagation," arXiv.org: 1409.7495, Feb. 2015, 11 pages.
Ganin et al., "Domain-Adversarial Training of Neural Networks," JMLR, Apr. 2016, 17: 1-35.
Gong et al., "Geodesic flow kernel for unsupervised domain adaptation," IEEE CVPR, Jun. 2012, 2066-2073.
Gopalan et al., "Domain Adaptation for Object Recognition: An Unsupervised Approach," IEEE ICCV, Nov. 2011, 999-1006.
Gretton et al., "A Kernel Two-Sample Test," JMLR, Mar. 2012, 723-773.
Hinterstoisser et al., "Model based training, detection and pose estimation of texture-less 3d objects in heavily cluttered scenes," ACCV, Nov. 2012, 548-562.
Huynh, "Metrics for 3d rotations: Comparison and analysis," Journal of Mathematical Imaging and Vision, Oct. 2009, 35(2):155-164.
Jia et al.,"Factorized latent spaces with structured sparsity," NIPS, 2010, 982-990.
JP Office Action in Japanese Application No. 2019-503932, dated May 18, 2020, 8 pages (with English translation).
KR Office Action in Korean Application No. 10-2019-7005982, dated May 18, 2020, 12 pages (with English translation).
LeCun et al., "Gradient-based learning applied to document recognition," Proc. IEEE, Nov. 1998, 86(11):2278-2324.
Lee et al. "Convolutional deep belief networks for scalable unsupervised learning of hierarchical representations," Proceedings of the 26th Annual international conference on Machine learning, Jun. 2009, 8 pages.
Lin et al., "Microsoft COCO: Common objects in context," ECCV, Sep. 2014, 740-755.

Long and Wang, "Learning transferable features with deep adaptation networks," ICML, Feb. 2015, 9 pages.
Mansour et al., "Domain adaptation with multiple sources," NIPS, 2009, 1041-1048.
Moiseev et al., "Evaluation of Traffic Sign Recognition Methods Trained on Synthetically Generated Data," ACIVS, Oct. 2013, 576-583.
Nam et al. "Learning Multi-Domain Convolutional Neural Networks for Visual Tracking," IEEE Conference on Computer Vision and Pattern Recognition, Jun. 27, 2016, 10 pages.
Netzer et al., "Reading digits in natural images with unsupervised feature learning," NIPS Workshops, 2011, 9 pages.
Okatani, Research Trend in Deep Learning for Visual Recognition: Advances of Convolutional Neural Networks and Their Use, Journal of the Japanese Society for Artificial Intelligence, 2016, 15 pages.
Olson, "Apriltag: A robust and flexible visual fiducial system," IEEE International Conference on Robotics and Automation (ICRA), May 2011, 3400-3407.
Oquab et al. "Learning and Transferring Mid-level Image Representations Using Convolutional Neural Networks," IEEE Conference on Computer Vision and Pattern Recognition, Jun. 23, 2014, 8 pages.
Pan et al. "A Survey on Transfer Learning," IEEE Transactions on Knowledge and Data Engineering, vol. 22(10) Oct. 1, 2010, 15 pages.
PCT International Preliminary Report on Patentability issued in International Application No. PCT/GR2016/000035, dated Feb. 7, 2019, 10 pages.
PCT International Search Report and Written Opinion issued in International Application No. PCT/GR2016/000035, dated Apr. 3, 2017, 15 pages.
PCT Written Opinion issued in International Application No. PCT/GR2016/000035, dated Jun. 27, 2018, 6 pages.
Raina et al. "Self-taught learning," Proceedings of the 24th International Conference on Machine Learning, Jun. 2007, 8 pages.
Russakovsky et al., "ImageNet Large Scale Visual Recognition Challenge," IJCV, Dec. 2015, 115(3):211-252.
Saenko et al., "Adapting visual category models to new domains," ECCV, Sep. 2010, 213-226.
Salzmann et al., "Factorized orthogonal latent spaces," AISTATS, Mar. 2010, 701-708.
Stallkamp et al., "Man vs. computer: Benchmarking machine learning algorithms for traffic sign recognition," Neural Networks, Aug. 2012, 32: 323-332.
Sun et al., "Return of frustratingly easy domain adaptation," AAAI, Mar. 2016, 8 pages.
Sutskever et al., "On the importance of initialization and momentum in deep learning," ICML, Feb. 2014, 1139-1147.
Tzeng et al., "Deep domain confusion: Maximizing for domain invariance," arXiv:1412.3474, Dec. 2014, 9 pages.
Tzeng et al., "Simultaneous deep transfer across domains and tasks," IEEE CVPR, 2015, 4068-4076.
Virtanen et al., "Bayesian CCA via group sparsity," ICML, Jun. 2011, 457-464.
Wohlhart and Lepetit, "Learning descriptors for object recognition and 3d pose estimation," IEEE CVPR, 2015, 3109-3118.
Xiao et al. "Learning Deep Feature Representations with Domain Guided Dropout for Person Re-identification," IEEE Conference on Computer Vision and Pattern Recognition, Jun. 27, 2016, 10 pages.

DOMAIN SEPARATION NEURAL NETWORKS

CROSS-REFERENCE TO RELATED APPLICATIONS

This application is a continuation of, and claims priority to, U.S. application Ser. No. 16/321,189, filed on Jan. 28, 2019, which is a national stage application under § 371 and which claims priority to International Application No. PCT/GR2016/000035, filed on Jul. 28, 2016. The disclosures of the prior applications are considered part of and are incorporated by reference in the disclosure of this application.

BACKGROUND

This specification relates to processing image data through the layers of neural networks to generate outputs.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

In general, this specification describes image processing neural networks that are implemented by one or more computers and that generate network outputs for images from a target domain that characterize the images. In particular, an image processing neural network system receives an input image from the target domain and processes the image to generate a shared feature representation of features of the input image that are shared between images from the target domain and images from a source domain different from the target domain. The image processing neural network system then generates a network output that characterizes the input image from the shared feature representation.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Particular embodiments of the subject matter described in this specification can be implemented so as to realize one or more of the following advantages. The neural network system as described in this specification can outperform the state-of-the-art on a range of unsupervised domain adaptation scenarios and additionally produce visualizations of the private and shared representations that enable interpretation of the domain adaptation process during training. The neural network system can learn representations that are domain invariant in scenarios where the data distributions during training and testing are different.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes an image processing neural network system implemented as computer programs on one or more computers in one or more locations.

The image processing neural network system processes input images from a target domain to generate a respective network output for each input image that characterizes the network image.

The image processing neural network system can be configured to generate a network output that characterizes a received image from the target domain in any of a variety of ways.

For example, the image processing neural network system can be configured to classify input images from the target domain as including images of objects from one or more object categories, i.e., to generate a classification output for an input image that includes a respective score for each of the one or more object categories that represents a likelihood that the input image includes an image of an object that belongs to the object category.

As another example, the image processing neural network system can be configured to estimate the pose of objects in input images. Generally, the pose of an object is a combination of the position and orientation of the object in the input image. For example, the system can generate as the network output a pose vector that includes an estimated location in the image of each of a predetermined number of body joints of the object.

As another example, the image processing neural network system can be configured to divide input images into multiple regions, each of which belongs to a different one of a set of categories. For example, the system can generate, as the network output, data, e.g., a vector or a matrix, that identifies for each pixel of the input image the category to which the pixel belongs.

Figure 1:
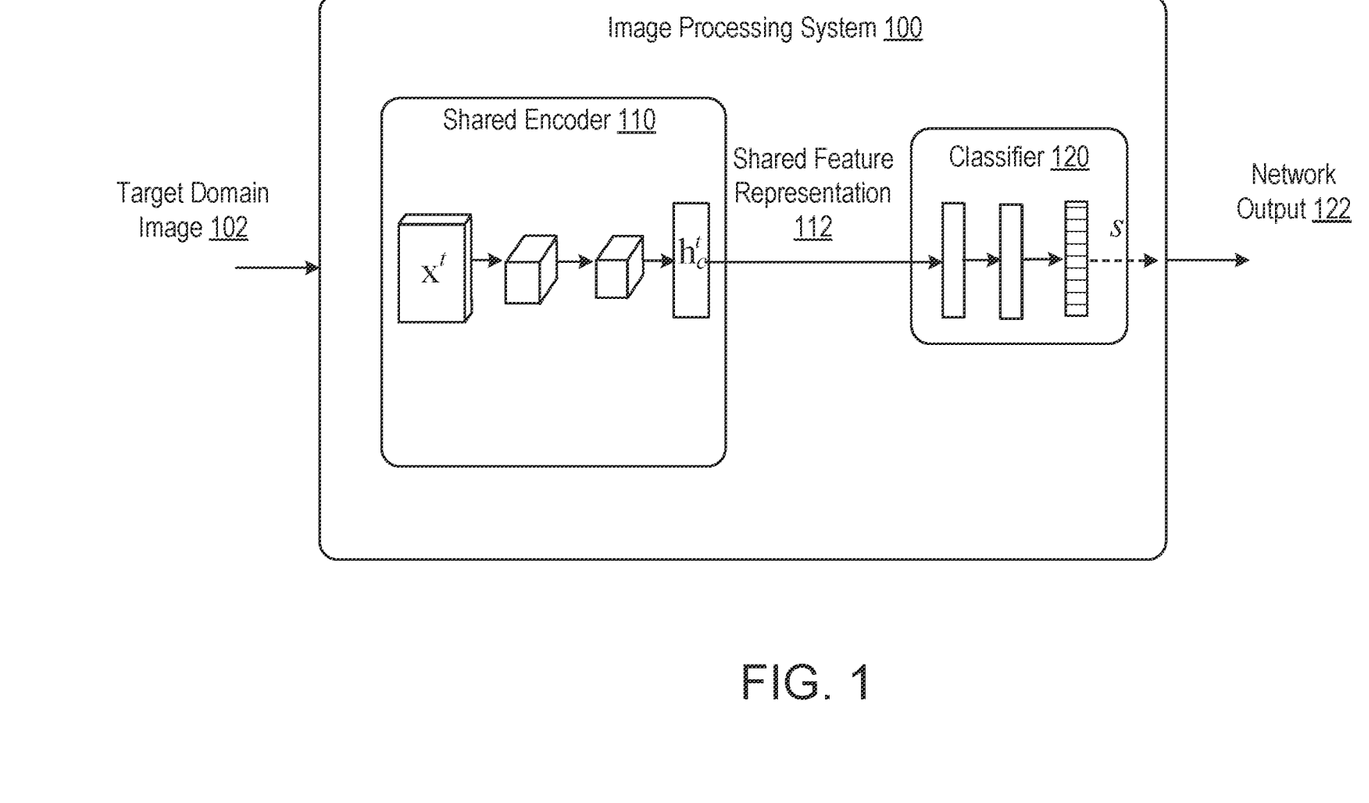
FIG. 1 shows an example image processing neural network system.

FIG. 1 shows an example image processing neural network system 100. The image processing neural network system 100 is an example of a system implemented as computer programs on one or more computers in one or more locations, in which the systems, components, and techniques described below can be implemented.

The image processing neural network system 100 receives as input a target domain image 102 and processes the target domain image 102 to generate a network output 122. As described above, the image processing neural network system 100 can be configured to generate various kinds of network outputs for received input images.

The image processing neural network system 100 includes a shared encoder neural network 110 and a classifier neural network 120.

The shared encoder neural network 110 is a neural network, e.g., a convolutional neural network, that has been configured through training to receive the target domain image 102 and to process the target domain image 102 to generate a shared feature representation 112 for the target domain image 102. The shared feature representation 112 is a vector of numeric values and is a representation of the features of the target domain image 102 that are shared between images from the target domain and images from a source domain.

Generally, the source domain is different from the target domain. In particular, the distribution of pixel values in images from the source domain is different from the distribution of pixel values in images from the target domain.

In some cases, the source and target domains differ primarily in terms of the distribution of low-level image statistics rather than high-level image statistics. Examples of low-level differences in the distributions include those arising due to noise, resolution, illumination and color. High-level differences, on the other hand, may include differences that relate to the number of classes, the types of objects, and geometric variations, such as 3D position.

In one example, the source domain may be images of a virtual environment that simulates a real-world environment and the target domain may be images of the real-world environment. For example, the source domain images may be images of a virtual environment that simulates a real-world environment that is to be interacted with by a robot or other mechanical agent or by an autonomous or semi-autonomous vehicle, while the target domain images may be images of the real-world environment as captured by the mechanical agent or the vehicle. Thus, the source domain images may be more expansive, in particular for edge cases that are occur rarely or are difficult or dangerous to generate in the real-world environment. By training the system to generate accurate network outputs for target domain images using only labeled source domain images as described in this specification, the performance of the agent or vehicle in the real-world environment may be improved, even if certain situations are only encountered in the simulated version.

In another example, the source and target domains may both be real-world images, but with photometric differences, e.g., one domain may be indoor images and the other domain may be outdoor images of similar objects.

In another example, the source and target domains may be images selected from different collections of images of similar objects. For example, the source domain may be images from a curated image collection and the target domain may be images from a non-curated data set, e.g., Internet images.

In some cases, the source domain may be a domain in which labeled images are easily available, while obtaining labeled image data for the target domain is computationally expensive or otherwise difficult or infeasible.

The classifier neural network 120 is a neural network, e.g., a fully-connected neural network, that has been configured through training to receive the shared feature representation 112 and to process the shared feature representation 112 to generate the network output 122 for the target domain image 102.

Training the shared encoder neural network 110 and the classifier neural network 120 to generate the shared feature representation 112 and the network output 122 is described in more detail below with reference to FIGS. 2 and 4.

Figure 2:
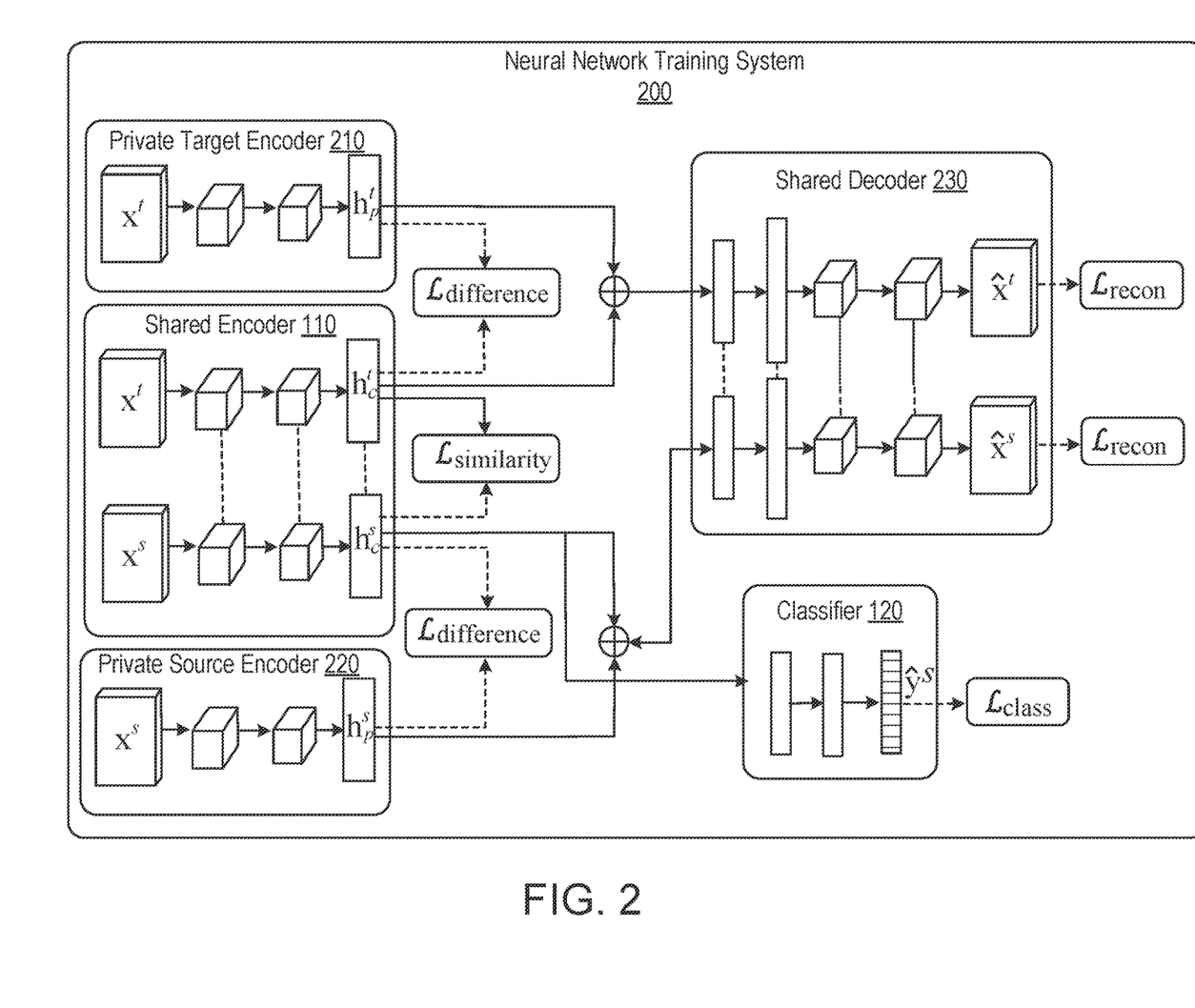
FIG. 2 shows an example neural network training system.

FIG. 2 shows an example neural network training system 200. The neural network training system 200 is an example of a system implemented as computer programs on one or more computers in one or more locations, in which the systems, components, and techniques described below can be implemented.

The neural network training system 200 trains the shared encoder neural network 110 and the classifier neural network 120 to generate network outputs for received images from the target domain.

In particular, the neural network training system 200 trains the shared encoder neural network 110 on labeled images from the source domain and unlabeled images from the target domain and trains the classifier neural network 120 only on the labeled images from the source domain. A labeled image is an image for which a known network output, i.e., the network output that should be generated by the classifier neural network 120 for the image, is available to the neural network training system 200 during training and an unlabeled image is an image for which no known network output is available to the neural network training system 200 during training.

To train the shared encoder neural network 110 and the classifier neural network 120, the neural network training system 200 also includes a private target encoder neural network 210, a private source encoder neural network 220, and a shared decoder neural network 230.

The private target encoder neural network 210 is specific to the target domain and is configured to receive images from the target domain and to generate, for each received image, a private feature representation of the image.

The private source encoder neural network 220 is specific to the source domain and is configured to receive images from the source domain and to generate, for each received image, a private feature representation of the image.

In some implementations, the private target encoder neural network 210, the private source encoder neural network 220, and the shared encoder neural network 110 have the same neural network architecture, e.g., are all convolutional neural networks with the same network architecture. In some other implementations, the private target encoder neural network 210 and the private source encoder neural network 220 are convolutional neural networks with an architecture that differs from that of the shared encoder neural network 110.

The shared decoder neural network 230 is configured to receive a combined feature representation of an image and to process the combined feature representation to generate a reconstruction of the image. In some implementations, the shared decoder neural network 230 is a deconvolutional neural network.

The combined feature representation of an image is a combination, e.g., a concatenation, a sum, or an average, of the shared feature representation of the image and the private feature representation of the image. That is, if the image is from the source domain, the combined feature representation is a combination of the private feature representation generated for the image by the private source encoder neural network 220 and the shared feature representation generated for the image by the shared encoder neural network 110. If the image is from the target domain, the combined feature representation is a combination of the private feature representation generated for the image by the private target encoder neural network 210 and the shared feature representation generated for the image by the shared encoder neural network 110.

During the training, the neural network training system 200 adjusts the values of the parameters of the shared encoder neural network 110, the classifier neural network 120, the private target encoder neural network 210, the private source encoder neural network 220, and the shared decoder neural network 230 to determine trained values of the parameters of each of the networks.

In particular, the neural network training system 200 trains the shared encoder neural network 110 to (i) generate shared feature representations for input images from the target domain that are similar to shared feature representations for input images from the source domain while (ii) generating shared feature representations for input images from the target domain that are different from private feature representations for the same input images from the target domain generated by the private target encoder neural network 210 and (iii) generating shared feature representations for input images from the source domain that are different from private feature representations for the same input images from the source domain generated by the private source encoder neural network 220.

Additionally, the neural network training system 200 trains the shared encoder neural network 110 to generate a shared feature representation for an input image from the target domain that, when combined with a private feature representation for the same input image generated by the private target encoder neural network 210, can be used to accurately reconstruct the input image by the shared decoder neural network 230 and to generate a shared feature representation for an input image from the source domain that, when combined with a private feature representation for the same input image generated by the private source encoder neural network 220, can be used to accurately reconstruct the input image by the shared decoder neural network 230.

Further, as part of the training, the neural network training system 200 trains the classifier neural network 120 to generate accurate network outputs on the labeled images from the source domain.

Training the shared encoder neural network 110, the classifier neural network 120, the private target encoder neural network 210, the private source encoder neural network 220, and the shared decoder neural network 230 to determine trained values of the parameters of each of the networks is described in more detail below with reference to FIG. 4.

In some implementations, once trained, the shared encoder neural network 110 and the shared decoder neural network 230 can be used to transform a target domain image into an image in the source domain. For example, the target domain image can be processed using the shared encoder neural network 110 to generate a shared representation. The shared representation could then be combined with a placeholder or desired private feature representation generated for the image generated by the private source encoder neural network 220 to generate a combined representation. The combined representation could then be processed by the shared decoder neural network 230 to generate a source domain image having the same features as the input target domain image.

Figure 3:
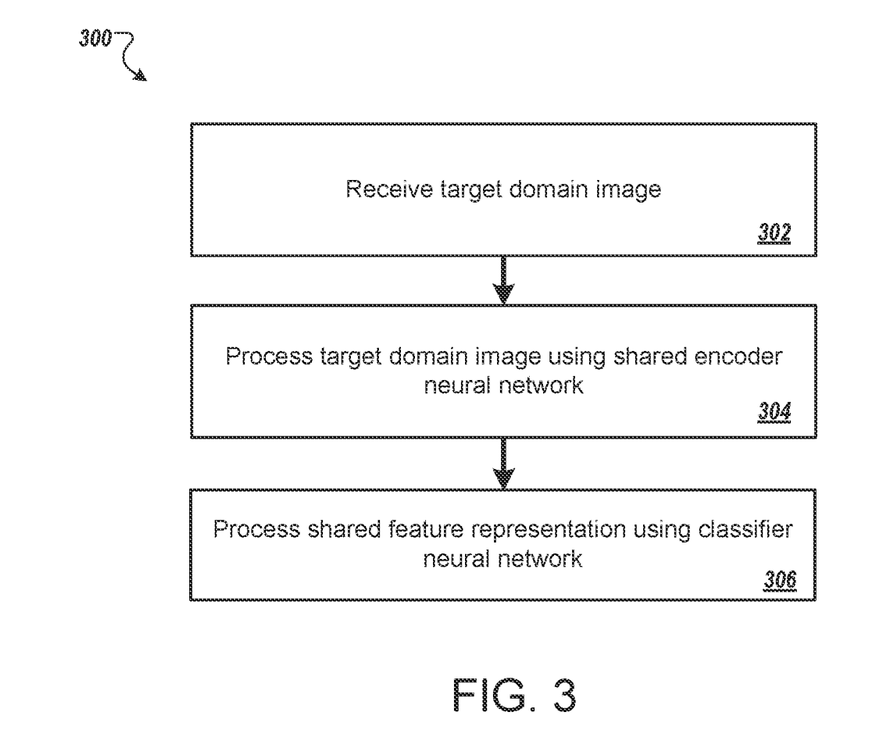
FIG. 3 is a flow diagram of an example process for generating a network output for an image from the target domain.

FIG. 3 is a flow diagram of an example process 300 for generating a network output for an image from the target domain. For convenience, the process 300 will be described as being performed by a system of one or more computers located in one or more locations. For example, an image processing neural network system, e.g., the image processing neural network system 100 of FIG. 1, appropriately programmed, can perform the process 300.

The system receives an image from the target domain (step 302).

The system processes the target domain image using a shared encoder neural network (step 304). As described above, the shared encoder neural network has been configured through training to receive the target domain image and to generate a shared feature representation of features of the target domain image that are shared between images from the target domain and images from the source domain.

The system processes the shared feature representation using a classifier neural network (step 306). As described above, the classifier neural network has been configured through training to receive the shared feature representation and to process the shared feature representation to generate a network output for the target domain image.

Figure 4:
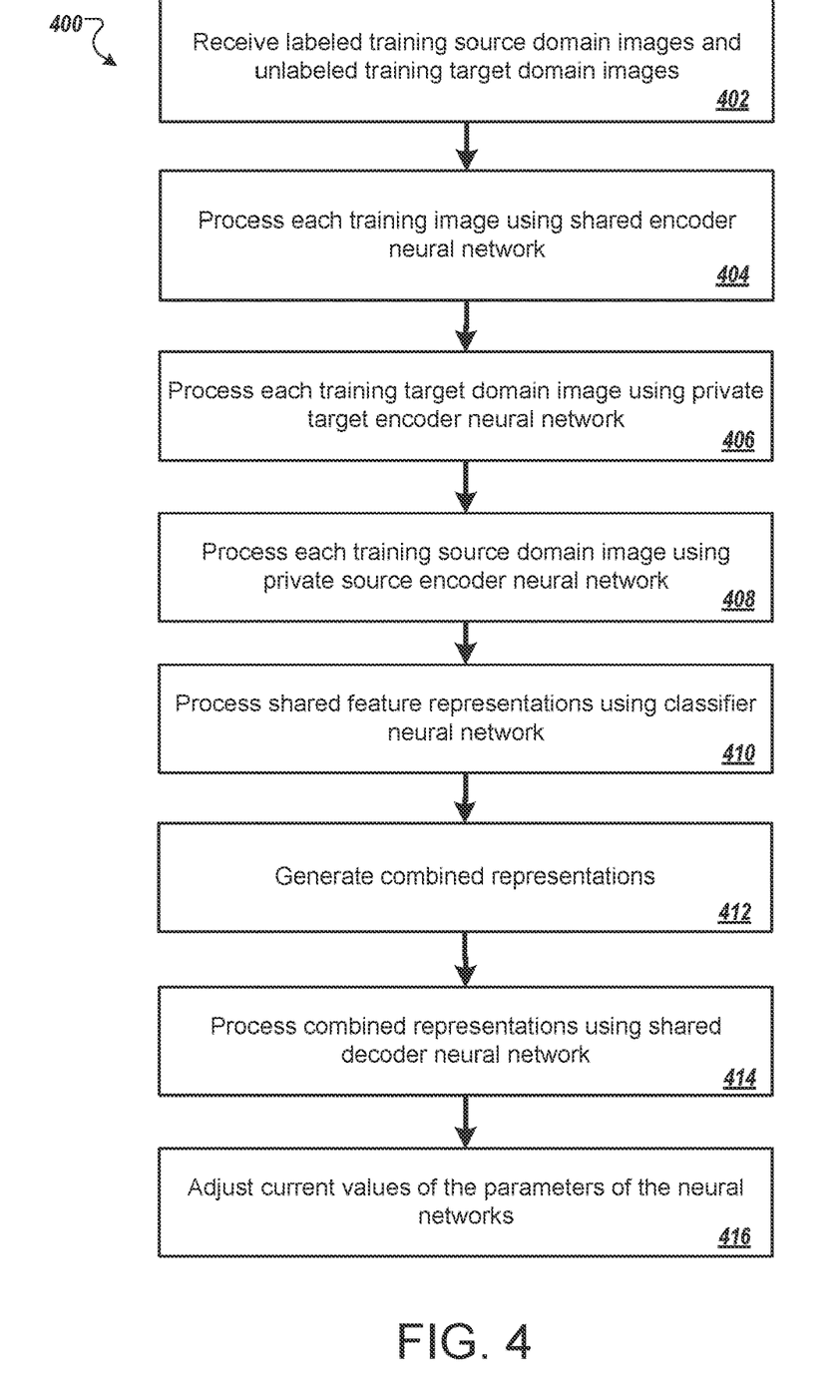
FIG. 4 is a flow diagram of an example process for performing an iteration of training a shared encoder neural network and a classifier neural network.

FIG. 4 is a flow diagram of an example process 400 for performing an iteration of training a shared encoder neural network and a classifier neural network. For convenience, the process 400 will be described as being performed by a system of one or more computers located in one or more locations. For example, a neural network training system, e.g., the neural network training system 200 of FIG. 1, appropriately programmed, can perform the process 400.

The system receives labeled training source domain images and unlabeled training target domain images (step 402).

The system processes each training source domain image and each training target domain image using a shared encoder neural network in accordance with current values of the parameters of the shared encoder neural network to generate a respective shared feature representation for each of the images (step 404).

The system processes each training target domain image using a private target encoder neural network in accordance with current values of the parameters of the private target encoder neural network to generate a respective private feature representation for each training target domain image (step 406).

The system processes each training source domain image using a private source encoder neural network in accordance with current values of the parameters of the private source encoder neural network to generate a respective private feature representation for each training source domain image (step 408).

For each training source domain image, the system processes the shared feature representation for the training source domain image using a classifier neural network in accordance with current values of the parameters of the classifier neural network to generate a network output for the training source domain image (step 410).

The system generates a respective combined representation for each training source domain image and each training target domain image, e.g., as described above with reference to FIG. 2 (step 412).

The system processes the combined representation for each of the training images using a shared decoder neural network in accordance with current values of the parameters of the shared decoder neural network to generate a reconstruction of the corresponding training image (step 414).

The system adjusts the current values of the parameters of the private target encoder neural network, the shared encoder neural network, the private source encoder neural network, the shared decoder neural network, and the classifier neural network to reduce a loss resulting from the outputs generated by the neural networks (step 416).

In particular, the system performs an iteration of a machine learning training technique, e.g., stochastic gradient with momentum, to minimize a loss that depends on a classification loss, a reconstruction loss, a difference loss, and a similarity loss. For example, the loss $\mathcal{L}$ may satisfy:

$$\mathcal{L} = \mathcal{L}_{task} + \alpha \mathcal{L}_{recon} + \beta \mathcal{L}_{difference} + \gamma \mathcal{L}_{similarity},$$

where $\mathcal{L}_{task}$ is the classification loss, $\mathcal{L}_{recon}$ is the reconstruction loss, $\mathcal{L}_{difference}$ is the difference loss, $\mathcal{L}_{similarity}$ is the similarity loss and $\alpha$, $\beta$, and $\gamma$ are weights that control the interaction of the loss terms.

The classification loss trains the classifier neural network and, by virtue of backpropogation, the shared encoder neural network to generate accurate network outputs for source domain images, i.e., to generate network outputs that match the known network outputs for the training source domain images. For example, the classification loss may satisfy:

$$\mathcal{L}_{task} = -\sum_{i=0}^{N_s} y_i^s \cdot \log \hat{y}_i^s,$$

where $N_s$ is the total number of labeled training source domain images, $y_i^s$ is the network output generated by the classifier neural network for the i-th training source domain image, and $\hat{y}_i^s$ is the known network output for the i-th training source domain image.

The reconstruction loss trains the shared decoder neural network and, by virtue of backpropagation, each of the encoder neural networks to generate accurate reconstructions of input images, i.e., to generate reconstructions of the training images that match the training images. For example, the reconstruction loss may be a scale-invariant mean squared error loss that satisfies:

$$\mathcal{L}_{recon} = \sum_{i=1}^{N_s} \mathcal{L}_{si\_mse}(x_i^s, \hat{x}_i^s) + \sum_{i=1}^{N_t} \mathcal{L}_{si\_mse}(x_i^t, \hat{x}_i^t),$$

where $N_t$ is the total number of training target domain images, $x_i^s$ is the i-th training source domain image, $\hat{x}_i^s$ is the reconstruction of the i-th training source domain image generated by the shared decoder neural network, $x_i^t$ is the i-th training target domain image, $\hat{x}_i^t$ is the reconstruction of the i-th training target domain image generated by the shared decoder neural network, and $\mathcal{L}_{si\_mse}$ is the scale-invariant mean squared error between an image and the reconstruction of the image that satisfies:

$$\mathcal{L}_{si\_mse}(x, \hat{x}) = \frac{1}{k}\|x - \hat{x}\|_2^2 - \frac{1}{k^2}([x - \hat{x}] \cdot 1_k)^2,$$

where $\|\cdot\|_2^2$ is the squared $L_2$-norm, k is the number of pixels in input x, and $1_k$ is a vector of ones of length k. Thus, the scale-invariant mean squared error penalizes differences between pairs of pixels, i.e., a pixel in a given training image and the corresponding pixel in the reconstruction of the training image. By minimizing this scale-invariant mean squared error loss, the system trains the shared decoder neural network to reproduce the overall shape of the objects being modeled without expending modeling power on the absolute color or intensity of the inputs.

The difference loss trains the shared encoder neural network to (i) generate shared feature representations for input images from the target domain that are different from private feature representations for the same input images from the target domain generated by the private target encoder neural network and (ii) generate shared feature representations for input images from the source domain that are different from private feature representations for the same input images from the source domain generated by the private source encoder neural network. For example, the difference loss may satisfy:

$$L_{difference} = \|H_c^{s^T} H_p^s\|_F^2 + \|H_c^{t^T} H_p^t\|_F^2,$$

where $H_c^s$ is a matrix having rows that are the shared feature representations of the training source domain images, $H_c^t$ is a matrix having rows that are the shared feature representations of the training target domain images, $H_p^s$ is a matrix having rows that are the private feature representations of the training source domain images, $H_p^t$ is a matrix having rows that are the private feature representations of the training target domain images, and $\|\cdot\|_F^2$ is the squared Frobenius norm.

The similarity loss trains the shared encoder neural network to generate shared feature representations for input images from the target domain that are similar to shared feature representations for input images from the source domain.

For example, in some cases, the similarity loss may be a domain adversarial similarity loss that trains the shared encoder neural network to generate the shared representations such that a domain classifier neural network cannot reliably predict the domain of the encoded representation. For example, the domain adversarial similarity loss $\mathcal{L}_{similarity}^{DANN}$ may satisfy:

$$\mathcal{L}_{similarity}^{DANN} = \sum_{i=0}^{N_s+N_t} \{d_i \log \hat{d}_i + (1 - d_i) \log(1 - \hat{d}_i)\}.$$

where $d_i$ is the value of a variable that identifies whether the i-th training image is from the target or source domain, and $\hat{d}_i$ is the predicted value of the variable as predicted by the domain classifier neural network by processing the shared feature representation for the i-th training image. The system can maximize this loss with respect to the parameters of the domain classifier neural network and minimize the loss with the respect to the parameters of the shared encoder neural network, i.e., by including a gradient reversal layer as the input layer of the domain classifier neural network and minimizing the overall loss.

As another example, in some other cases, the similarity loss may be a Maximum Mean Discrepancy loss that is a kernel-based distance function between pairs of samples. For example, the Maximum Mean Discrepancy loss $\mathcal{L}_{similarity}^{MMD}$ may satisfy:

$$\mathcal{L}_{similarity}^{MMD} = \frac{1}{(N^s)^2} \sum_{i,j=0}^{N^s} \kappa(h_{ci}^s, h_{cj}^s) - \frac{2}{N^s N^t} \sum_{i,j=0}^{N^s, N^t} \kappa(h_{ci}^s, h_{cj}^t) + \frac{1}{(N^t)^2} \sum_{i,j=0}^{N^t} \kappa(h_{ci}^t, h_{cj}^t),$$

where $K(.,.)$ is a PSD kernel function, $h_c^s$ is the shared feature representation of a training source domain image, and $h_c^T$ is the shared feature representation of a training target domain image. In some cases, the PSD kernel function may be a linear combination of multiple different RBF kernels.

The system can repeatedly perform the process 400 on different batches of labeled training source domain images and unlabeled training target domain images to train the neural networks by iteratively adjusting the values of the parameters of the neural networks to determine trained values of the parameters of the neural networks.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A system comprising:
a shared encoder neural network implemented by one or more computers, wherein the shared encoder neural network is configured to:
receive an input from a target domain; and
process the input to generate a shared feature representation of features of the input that are shared between inputs from the target domain and inputs from a source domain different from the target domain, wherein the shared encoder neural network has been trained to generate a shared feature representation for the input from the target domain that, when combined with a private feature representation for the same input from the target domain generated by a private target encoder neural network that is specific to the target domain, can be used to accurately reconstruct the input by a shared decoder neural network; and
a classifier neural network implemented by the one or more computers, wherein the classifier neural network is configured to:
receive the shared feature representation; and
process the shared feature representation to generate a network output for the input that characterizes the input.

2. The system of claim 1, wherein inputs from the target domain have different low level statistics than inputs from the source domain.

3. The system of claim 1, wherein the network output is a classification output.

4. The system of claim 1, wherein the input is an image and the network output is a pose estimation output or a classification output.

5. The system of claim 1, wherein classifier neural network has been trained on labeled inputs from the source domain.

6. The system of claim 1, wherein the shared encoder neural network has been trained to generate shared feature representations for inputs from the target domain that are similar to shared feature representations for inputs from the source domain.

7. The system of claim 6, wherein the shared encoder neural network has been trained to generate shared feature representations for inputs from the target domain that are different from private feature representations for the same inputs from the target domain generated by the private target encoder neural network that is specific to the target domain.

8. The system of claim 7, wherein the shared encoder neural network has been trained to generate shared feature representations for inputs from the source domain that are different from private feature representations for the same inputs from the source domain generated by a private source encoder neural network that is specific to the source domain.

9. The system of claim 7 wherein the shared encoder neural network has been trained to generate a shared feature representation for an input from the source domain that, when combined with a private feature representation for the same input generated by the private source encoder neural network, can be used to accurately reconstruct the input by the shared decoder neural network.

10. The system of claim 9, wherein the shared encoder neural network, the private source encoder neural network, and the private target encoder neural network are convolutional neural networks with a same architecture but different parameter values.

11. The system of claim 1 wherein the classifier neural network is a fully-connected neural network.

12. A non-transitory computer-readable storage medium encoded with instructions that, when executed by one or more computers, cause the one or more computers to implement: a shared encoder neural network, wherein the shared encoder neural network is configured to: receive an input from a target domain; and process the input to generate a shared feature representation of features of the input that are shared between inputs from the target domain and inputs from a source domain different from the target domain, wherein the shared encoder neural network has been trained to generate a shared feature representation for the input from the target domain that, when combined with a private feature representation for the same input from the target domain generated by a private target encoder neural network that is specific to the target domain, can be used to accurately reconstruct the input by a shared decoder neural network; and a classifier neural network, wherein the classifier neural network is configured to: receive the shared feature representation; and process the shared feature representation to generate a network output for the input that characterizes the input.

13. The non-transitory computer-readable storage medium of claim 12, wherein inputs from the target domain have different low level statistics from inputs from the source domain.

14. The non-transitory computer-readable storage medium of claim 12, wherein the network output is an object classification output or a pose estimation output.

15. A method performed by one or more computers, the method comprising:
receiving an input from a target domain;
processing the input from the target domain using a shared encoder neural network, wherein the shared encoder neural network is configured to:
receive the input from the target domain; and
process the input to generate a shared feature representation of features of the input that are shared between inputs from the target domain and inputs from a source domain different from the target domain, wherein the shared encoder neural network has been trained to generate a shared feature representation for the input from the target domain that, when combined with a private feature representation for the same input from the target domain generated by a private target encoder neural network that is specific to the target domain, can be used to accurately reconstruct the input by a shared decoder neural network; and
processing the input from the target domain using a classifier neural network, wherein the classifier neural network is configured to:
receive the shared feature representation; and
process the shared feature representation to generate a network output for the input that characterizes the input.

16. The method of claim 15, wherein inputs from the target domain have different low level statistics than inputs from the source domain.

17. The method of claim 15, wherein the network output is an object classification output.

18. The method of claim 15, wherein the input is an image and the network output is a pose estimation output or a classification output.

19. The method of claim 15, wherein classifier neural network has been trained on labeled inputs from the source domain.

20. The method of claim 15, wherein the shared encoder neural network has been trained to generate shared feature representations for inputs from the target domain that are similar to shared feature representations for inputs from the source domain.

21. The method of claim 20, wherein the shared encoder neural network has been trained to generate shared feature representations for inputs from the target domain that are different from private feature representations for the same inputs from the target domain generated by the private target encoder neural network that is specific to the target domain.

22. The method of claim 21, wherein the shared encoder neural network has been trained to generate shared feature representations for inputs from the source domain that are different from private feature representations for the same inputs from the source domain generated by a private source encoder neural network that is specific to the source domain.

23. The method of claim 21, wherein the shared encoder neural network has been trained to generate a shared feature representation for an input from the source domain that, when combined with a private feature representation for the same input generated by the private source encoder neural network, can be used to accurately reconstruct the input by the shared decoder neural network.

24. The method of claim 23, wherein the shared encoder neural network, the private source encoder neural network, and the private target encoder neural network are convolutional neural networks with a same architecture but different parameter values.

25. The method of claim 15, wherein the classifier neural network is a fully-connected neural network.

* * * * *